United States Patent [19]

Corbasson

[11] Patent Number: 4,854,685
[45] Date of Patent: Aug. 8, 1989

[54] VARIABLE-FOCUS OBJECTIVE-LENS DEVICE AND A METHOD FOR THE CONTROL OF SAID DEVICE

[75] Inventor: Gérard Corbasson, Saint-Heand, France

[73] Assignee: Etablissements Pierre Angenieux, Saint-Heand, France

[21] Appl. No.: 191,029

[22] Filed: Apr. 28, 1988

[30] Foreign Application Priority Data

Apr. 29, 1987 [FR] France .................. 87 06074

[51] Int. Cl.⁴ .................. G02B 7/10; G02B 15/16
[52] U.S. Cl. .................. 350/427; 350/429
[58] Field of Search .................. 350/429, 427

[56] References Cited

U.S. PATENT DOCUMENTS 4,043,642 8/1979 Hirose et al. .
4,541,695 9/1985 Wainwright et al. ............... 350/429
4,636,040 1/1987 Tokumaru ........................... 350/427
4,708,444 11/1987 Tsuji ................................... 350/427

FOREIGN PATENT DOCUMENTS 1304090 4/1902 France .
56-121007 9/1981 Japan .
2141260 12/1984 United Kingdom .

OTHER PUBLICATIONS

"Television Zoom Lens with Three Integrated Zoom Ranges", *S.M.P.T.E. Journal*, vol. 91, No. 9, Sep. 1982, By K. Macher, pp. 808–815.

*Primary Examiner*—Bruce Y. Arnold
*Assistant Examiner*—Rebecca D. Gass
*Attorney, Agent, or Firm*—Young & Thompson

[57] ABSTRACT

Two movable groups of lenses forming a variator are controlled by means of a computer and these groups are accordingly subjected not only to the necessary displacements of each group for the progressive variations of focal length but also to a complementary longitudinal displacement for applying to the objective-lens system a focal-length multiplier coefficient having a value chosen by the operator. The device in accordance with the invention comprises a control system associated with a computer and capable of subjecting the two movable groups of lenses to a complementary longitudinal displacement in order to apply a focal length multiplier coefficient to the objective-lens system, another function of the computer being to produce the desired variation of the iris and the complementary displacements of the focusing groups in respect of each focal length. The longest possible focal length can thus be chosen as a function either of the selected numerical aperture or of the field to be covered.

3 Claims, 4 Drawing Sheets

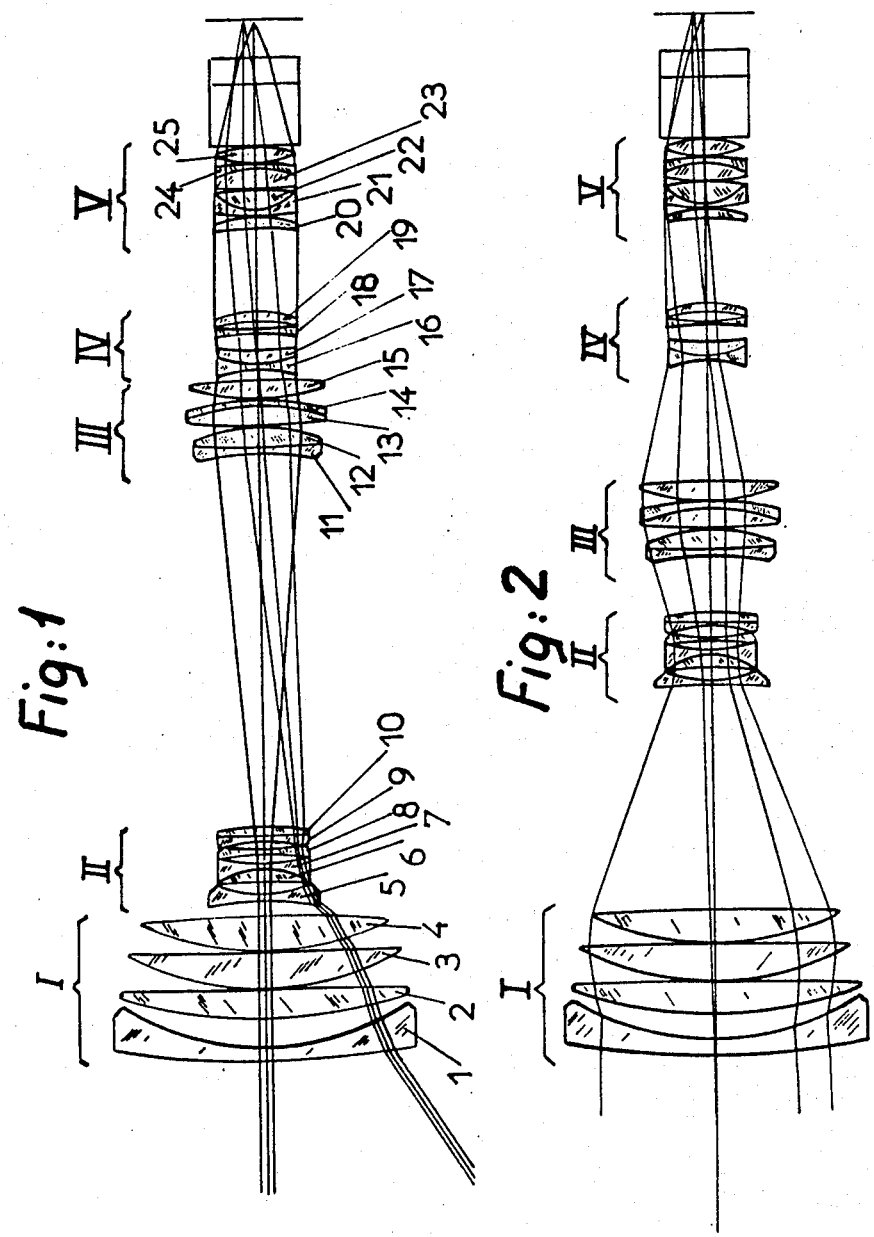

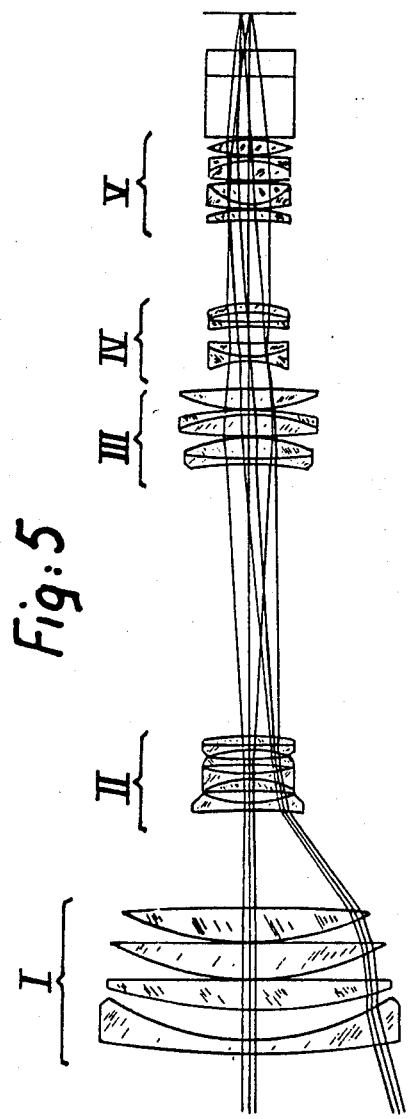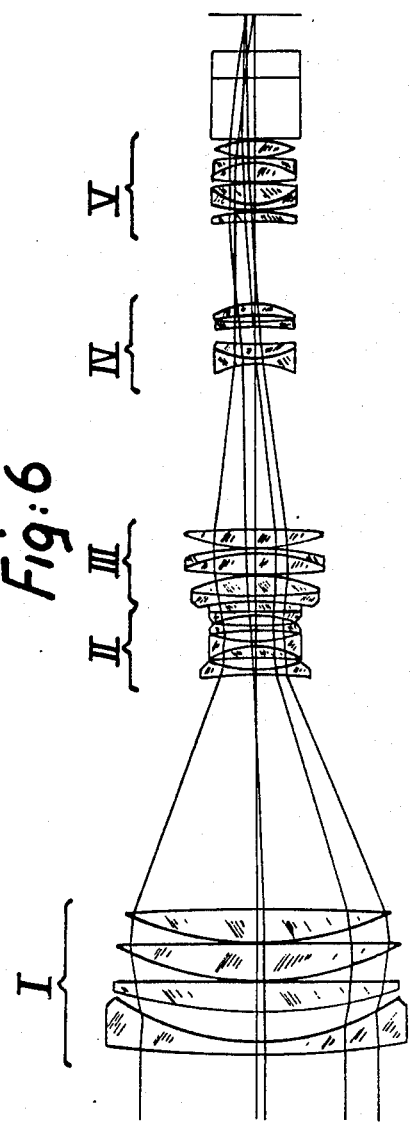

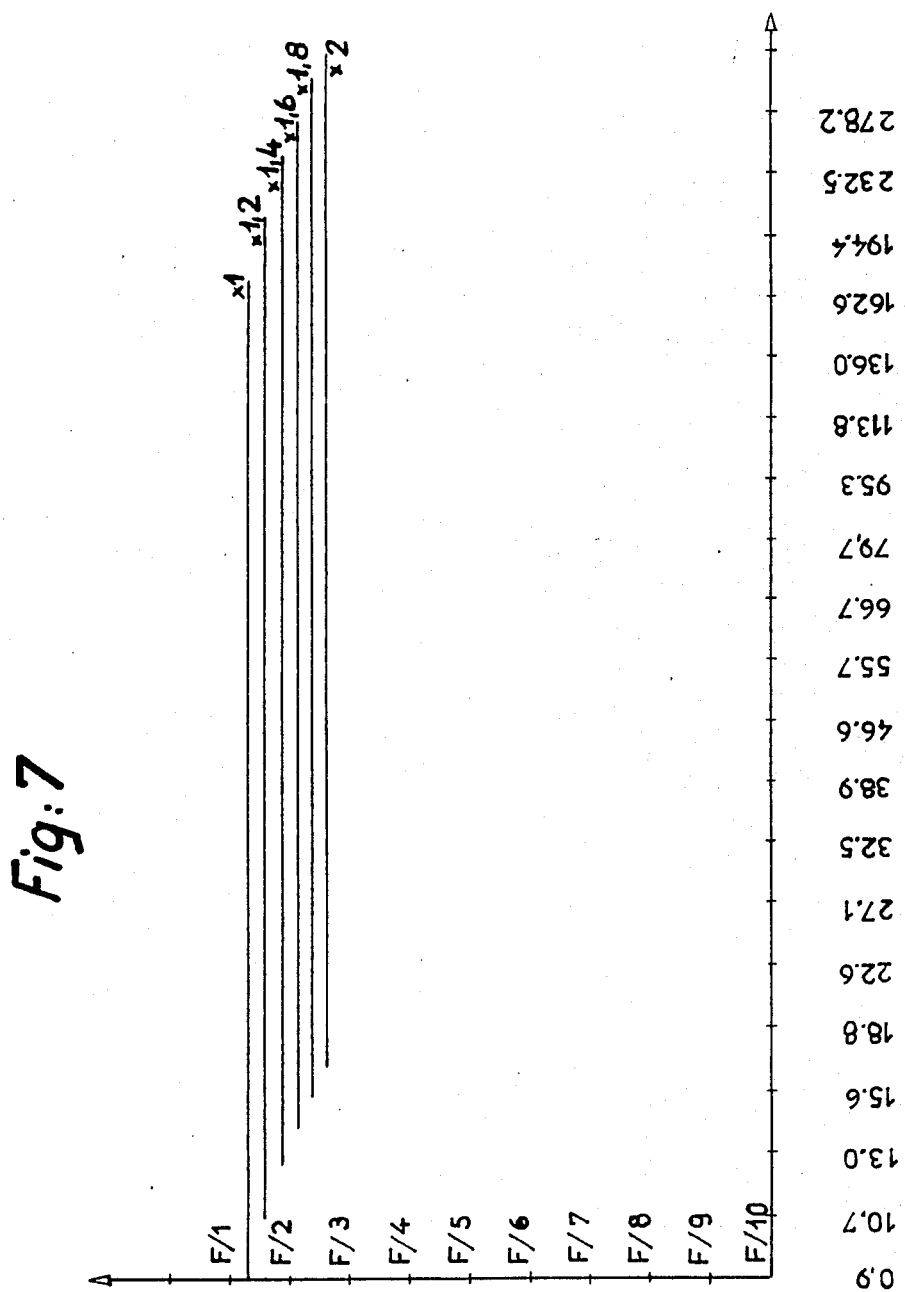

VARIABLE-FOCUS OBJECTIVE-LENS DEVICE AND A METHOD FOR THE CONTROL OF SAID DEVICE

BACKGROUND OF THE INVENTION

1. Field of the Invention

The present invention relates to variablefocus objective lenses which are more particularly intended to be employed in television studios.

2. Description of the Prior Art

Devices of this type are made up of several groups of lens elements, the displacements of which make it possible to obtain a variation of field at the same time as a still picture on the receiver irrespective of the focusing distance chosen. As a general rule, the function of variation of focal lengths is performed by two movable groups of lenses constituting a so-called "variator" whilst the other groups undergo suitable displacements in order to adjust focusing under the best possible conditions of picture quality up to minimal distances, that is, practically against the front element. In order to obtain the still picture, the laws of displacements of the movable groups are computed and applied in real time as a function of the desired focal length and distance.

In the majority of objective-lens systems employed in television studios, a system is provided in addition for carrying out multiplication of the basic focal length. This system consists of a rotary lens turret placed behind the iris and adapted to carry a number of quasi-afocal lens elements, each of which may thus be put into service in order to obtain a different multiplier coefficient.

This makes it possible to obtain a constant variation ratio and to choose the basic focal length as a function of the field angles which can be employed. However, since the maximum available f-number is proportional to the basic focal length, this must be taken into account in the choice of the multiplier. In fact, by choosing a situation which is conducive to long focal lengths, it may happen that the lens aperture is stopped-down too far. The ideal arrangement, in the event that the quantity of light is critical and that it is therefore desired to give priority to the lens aperture, would be to have a large number of multipliers and to be in a position to choose the best compromise. This is not possible, however, with current systems consisting of a lens turret which carries a limited number of quasi-afocal lens elements corresponding to as many different multiplier coefficients.

Another characteristic of existing objective-lens systems of the type under consideration is that the multiplier system thus provided is located in a quasi-afocal region behind the iris. This actually has the effect of significantly changing the position of the exit pupil and therefore the distribution of colors in the picture (colored spot) as a result of the changes in angle of incidence of the principal beams on the dichroic mirrors of the camera separator. This phenomenon is aggravated when the exit pupil is relatively close to the image and also when "ramping" occurs or in other words when the f-number varies with the focal length. In this case, the exit pupil is in fact the image of the diameter of any one group of the variator and often of the front element, the dimensions of which are always limited so as to reduce the weight and volume, and is no longer the image of the iris. Furthermore, the spectrum transmission is modified by introduction of additional lenses.

It is for the reasons given above that the object of the invention is to permit the application of multiplier coefficients for multiplication of the basic focal length of an objective-lens system of the type considered while removing the disadvantages of the system discussed in the foregoing.

SUMMARY OF THE INVENTION

To this end, the invention has for its primary object a particular method of control of an objective-lens system of this type which is so designed as to permit application of a plurality of multiplier coefficients for multiplication of the basic focal length without any need to have recourse to a lens-turret system of the type recalled earlier. This method is designed for the control of a variable-focus objective-lens system consisting of at least two movable groups of lenses forming a variator and at least two other groups which have the function of focusing by displacement and the position of which is defined as a function of the two variables consisting of focal length and focusing distance.

The distinctive feature of this method lies in the fact that, since the displacements of the two movable groups forming a variator are controlled by means of a computer, these groups are subjected not only to the necessary displacements of each group for the variations of focal length but also to a complementary longitudinal displacement for applying to the objective-lens system a focal-length multiplier coefficient having a value chosen by the operator, another function of the computer being accordingly to produce the required variation of the iris and the complementary displacements of the focusing groups in respect of each focal length.

Thus the multiplier function is performed by means of complementary displacements of the movable groups which also serve as a variator. As will become apparent hereinafter, this offers considerable advantage over the system used in the prior art.

However, it is another object of the invention to provide an objective-lens device designed for implementation of the method defined in the foregoing. This device is distinguished by the following features:

(1) the two movable groups of lenses forming a variator have characteristics such that, in addition to the ability to produce variations in focal length of the lens system, they are capable under the action of a complementary longitudinal displacement of carrying out multiplication of the basic focal length and the arrangement is such that, in their end positions, these two groups are still capable of undergoing a similar complementary displacement;

(2) in combination with this lens system, the device under consideration is provided for the purpose of producing displacements of the movable groups of lens elements with a control system associated with a compute and capable of subjecting these two movable groups of lenses not only to the displacements required for each group in order to produce a progressive variation in focal length but also to a complementary longitudinal displacement in order to apply to the objective-lens system a focal length multiplier coefficient having a value chosen by the operator, another function of said computer being to produce the desire variation of the iris and the complementary displacements of the focusing groups in respect of each focal length.

BRIEF DESCRIPTION OF THE DRAWINGS

FIG. 1 is a longitudinal sectional view of an objective-lens system according to the invention in its normal situation in which the groups of lenses are shown in a position of short focal length.

FIG. 2 is a similar view showing the groups of lenses of said objective-lens system in a position of long focal length, said lens system being again shown in its normal situation.

FIG. 5 is a similar view showing the objective-lens system in a different situation, namely a multiplication of the basic focal length corresponding to the coefficient 2, the groups of lenses being shown in a position of short focal length.

FIG. 6 is a similar view showing the objective-lens system in the same situation but in this case said groups of lenses are in a position of long focal length.

FIG. 7 is a table indicating the different possible apertures as a function of the focal length of the objective-lens system.

DETAILED DESCRIPTION OF THE INVENTION

Figure 3:
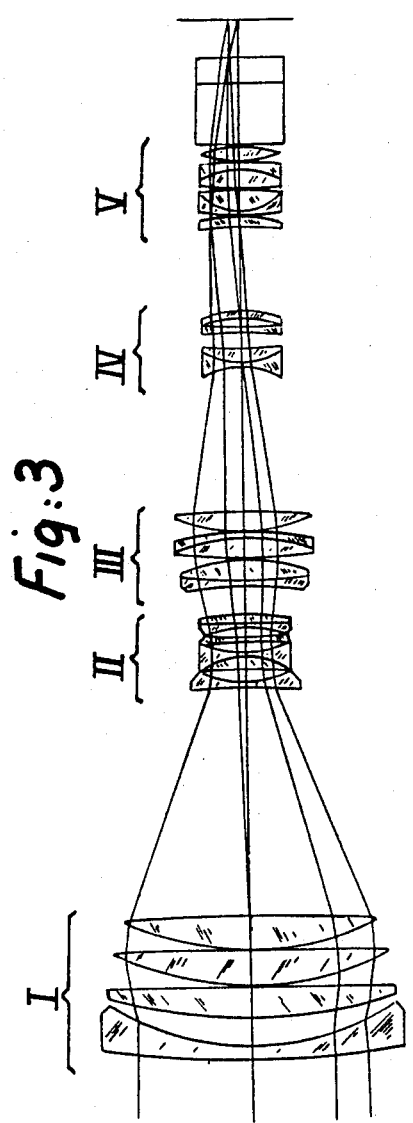
FIG. 3 is a similar view showing the same objective-lens system in a situation of multiplication of its basic focal length by a coefficient of 1.4, the groups of lenses being shown in a position of short focal length.

The objective-lens system illustrated in FIGS. 1 to 6 is made up of five groups of lenses I, II, III, IV, V. Among these latter, the two groups II and III are movable and have the function of constituting the "variator" element for varying the focal length of the objective-lens system as a function of a predetermined optical law. The two groups I and V are also movable but do not take part in the variation in focal length of the objective-lens system. The function of these two groups is in fact to adjust focusing by means of their displacements, their positions being defined as a function of the two variables consisting of focal length and focusing distance.

Group I is convergent as is also the case with groups III and V. In regard to groups II and IV, they are divergent.

In the lens system being considered, and proceeding from left to right as in the drawings, group I comprises a first divergent lens 1 and three other convergent lenses 2, 3 and 4. Group II comprises a divergent lens 5, a divergent doublet 6–7, a divergent lens 8 and a divergent doublet 9–10.

So far as group III is concerned, this group is constituted from the front end to the rear end by a first convergent doublet 11–12, a second convergent doublet 13–14 and a convergent lens 15.

Group IV comprises a convergent doublet 16–17, a divergent lens 18 and a convergent meniscus lens 19.

Finally, group V comprises a convergent meniscus lens 20, a first convergent doublet 21–22, a second convergent doublet 23–24 and a convergent lens 25.

The objective-lens system thus constituted is a variable-focus lens system having a basic focal length of 8.5 and a coefficient of variation of twenty times this focal length. Its maximum aperture is accordingly f-1.3.

The four groups I, II, III and IV and the various lenses of these groups comply with the following inequalities in which:

$F'1$, $F'2$, $F'3$ and $F'4$ each correspond to the focal length of a group considered from front to rear, $f'1, f'2 \ldots f'5$ each correspond to the focal length of a lens considered from front to rear, $R1, R2 \ldots$ correspond to the radius of each surface of curvature considered from front to rear, (a) General relations $2(F'2) < (F'3) < 3(F'2)$
$2(F'3) < (F'1) < 3(F'3)$ (b) Relations in Group I $\frac{1}{2}F'1 < R2 < \frac{3}{2}F'1$ $\frac{1}{2}F'1 < R5 < \frac{3}{2}F'1$ $\frac{1}{2}F'1 < R7 < 2(F'1)$ $(F'1)(f'4) < 2(F'1)$ (c) Relations in Group II $(F'2) < R10 < 3(F'2)$
$(F'2 < (f'5) < 3(F'2)$
$(F'2) < (f'6) < 3(F'2)$
$(F'2) < (f'6) < 3(F'2)$
$1.65 < n9 < 1.85$ (d) Relations in Group III $(F'3) < (R21) < 2(F'3)$
$(F'3) < (R25) < 2(F'3)$
$(F'3) < (f'12) < 3(F'3)$
$(F'3) < (f'13) < 3(F'3)$
$(F'3) < (f'15) < 3(F'3)$ In regard to the numerical values of the radii of the different lenses as well as the intermediate air spaces existing in each group, they are indicated in the table given hereinafter. In this table, the radii of curvatures are designated by the indications R1, R2, R3 ... following the order of the different surface areas of lenses from the front end to the rear end. In regard to the air spaces, they are designated by the indications E1, E2, E3 ..., these latter being numbered according to their position from the front end to the rear end.

TABLE

ZOOM LENS 20 × 8.5
APERTURE = f-1.3

| | | | | |
|---|---|---|---|---|
| R1 = | 574.233 | E1 = | 7.000 | 785259 |
| R2 = | 147.083 | E2 = | 16.000 | AIR |
| R3 = | 271.402 | E3 = | 17.000 | 516642 |
| R4 = | −17101.590 | E4 = | .200 | AIR |
| R5 = | 169.226 | E5 = | 20.000 | 516642 |
| R6 = | −55807.890 | E6 = | .200 | AIR |
| R7 = | 171.489 | E7 = | 19.000 | 603655 |
| R8 = | −1365.530 | E8 = | 8.279 | AIR |
| R9 = | −333.416 | E9 = | 2.400 | 883408 |
| R10 = | 63.099 | E10 = | 7.300 | AIR |
| R11 = | −400.732 | E11 = | 7.500 | 785257 |
| R12 = | −46.469 | E12 = | 2.000 | 620603 |
| R13 = | 93.146 | E13 = | 5.500 | AIR |
| R14 = | −185.314 | E14 = | 2.400 | 620603 |
| R15 = | 225.379 | E15 = | 5.600 | AIR |
| R16 = | −70.541 | E16 = | 2.000 | 620603 |
| R17 = | −2632.278 | E17 = | 5.500 | 785257 |
| R18 = | −134.123 | E18 = | 203.890 | AIR |
| R19 = | −213.828 | E19 = | 2.800 | 728284 |
| R20 = | 456.882 | E20 = | 11.800 | 620603 |

TABLE-continued

ZOOM LENS 20 × 8.5
APERTURE = f-1.3

| R21 = | −90.853 | E21 = | .200 | AIR |
|---|---|---|---|---|
| R22 = | 465.654 | E22 = | 11.800 | 620603 |
| R23 = | −101.472 | E23 = | 2.800 | 728284 |
| R24 = | −172.477 | E24 = | .200 | AIR |
| R25 = | 111.958 | E25 = | 11.200 | 516642 |
| R26 = | −454.108 | E26 = | 5.750 | AIR |
| R27 = | −58.702 | E27 = | 1.800 | 652587 |
| R28 = | 44.822 | E28 = | 8.000 | 755275 |
| R29 = | 183.422 | E29 = | 10.000 | AIR |
| R30 = | −168.681 | E30 = | 2.000 | 652587 |
| R31 = | 341.707 | E31 = | 4.300 | AIR |
| R32 = | −93.665 | E32 = | 6.000 | 806409 |
| R33 = | −52.237 | E33 = | 45.000 | AIR |
| R34 = | −253.235 | E34 = | 5.700 | 497816 |
| R35 = | −74.636 | E35 = | .200 | AIR |
| R36 = | 129.994 | E36 = | 1.800 | 772497 |
| R37 = | 30.625 | E37 = | 12.400 | 497816 |
| R38 = | −177.671 | E38 = | .200 | AIR |
| R39 = | 326.308 | E39 = | 11.300 | 497.816 |
| R40 = | −45.166 | E40 = | 1.800 | 806409 |
| R41 = | −506.625 | E41 = | .200 | AIR |
| R42 = | 56.736 | E42 = | 9.300 | 497816 |
| R43 = | −61.245 | E43 = | 1.000 | AIR |
| R44 = | 999999999.000 | E44 = | 33.000 | 603380 |
| R45 = | 999999999.000 | E45 = | 14.500 | 517642 |
| R46 = | 999999999.000 | E46 = | .000 | AIR |

As already mentioned earlier, FIGS. 1 and 2 illustrate the objective-lens system in its normal situation, that is to say in the case of a basic focal length of 8.5. In FIG. 1, the movable groups II and III are shown in their positions corresponding to a short focal length. On the other hand, in FIG. 2, the same two groups are shown in their position of short focal length.

In the last-mentioned position, groups II and III are not in closely spaced relation but there exists a relatively large gap which permits closer spacing in other cases at the time of multiplication of the basic focal length. This is made possible by suitably determining the characteristics of the different elements of the objective-lens system and especially a judicious reduction in overall length of groups II and III. The reduction of overall length is obtained by making use of glasses having high refractive indices in certain lenses of elements II and III, thus having the effect of reducing the curvatures and therefore the volume.

The essential characteristic of the objective lens system in accordance with the invention lies in the fact that the two groups II and III have configurations and characteristics such that they are capable of performing two separate and distinct functions as follows:

(1) their normal function of variator for progressively varying the focal length of the objective-lens system;

(2) a function of multiplier for multiplying the basic focal length in accordance with a very large number of possible multiplication coefficients.

Moreover, the different movable groups of the objective-lens system considered are made dependent on a control device comprising a computer and capable of subjecting the two movable groups II and III not only to the displacements required for progressive variation in focal length but also to a complementary longitudinal displacement for applying to the objective-lens system a focal length multiplication coefficient having a value chosen by the operator. Accordingly, the operator need only depress a push-button of this control device in order to obtain a multiplication of the basic focal length in accordance with a predetermined coefficient. This accordingly produces the desired complementary displacements of the two groups II and III in order to carry out the corresponding multiplication of focal length. In such a case, however, the computer also determines the requisite variation of the iris and the complementary displacements of the focusing groups in respect of each focal length.

Figure 4:
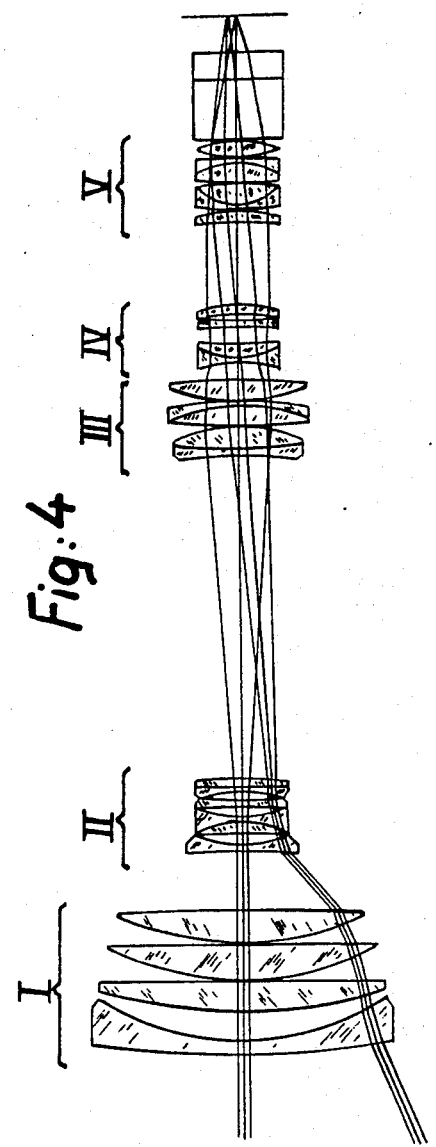
FIG. 4 is a view illustrating said objective-lens system in the same situation but in this case the groups of lenses are in a position of long focal length.

Thus FIGS. 3 and 4 represent the movable groups II and III of the present objective-lens system, respectively in their position of short focal length and in their position of long focal length in the case considered in which a multiplication coefficient g of 1.4× has been applied to the objective-lens system by means of a suitable complementary displacement of the two groups II and III. In consequence, the basic focal length now becomes 1.9 and the objective-lens system is thus a variable-focus lens system of 20×11.9.

In regard to FIGS. 5 and 6, they illustrate the movable groups II and III of the objective-lens system under consideration, respectively in their position of short focal length and in the long focal length position whereas a multiplier coefficient g of 2×a has been applied to this latter. In consequence, the basic focal length of this objective-lens system now becomes 17, with the result that it constitutes a variable-focus objective of 20×17. It is worthy of note that, in this case, there exists in the long focal-length position a relatively substantial spacing both between groups I and II on the one hand and between groups III and IV on the other hand. This is necessary to permit a close spacing in the short focal-length position in the case of the normal situation of the objective-lens system (as shown in FIG. 1). The characteristics of the different groups and of their lenses are therefore determine accordingly.

However, the two cases illustrated respectively in FIGS. 3 and 4 and in FIGS. 5 and 6 constitute only examples which are given by way of indication. It is in fact possible to apply to the objective-lens system a large number of multiplier coefficients having different values subject to the condition that the control device is determined in consequence and that the computer has a program which is also established for this purpose.

The essential feature of the device in accordance with the invention therefore lies in the fact that the multiplying function which had thus far been performed by a turret of quasi-afocal lenses located in the rear stationary portion of the objective-lens system and usually limited to one or two positions is replaced in this device by a complementary longitudinal displacement of the elements of the variator.

It thus becomes possible to choose very precisely the longest focal length desired as a function of the numerical aperture chosen or of the field to be covered Thereupon, the variation in focal length always takes place in the same maximum ratio with a constant aperture. It is thus possible in actual fact to give priority of choice to the aperture and to improve the compromise.

This novel situation in fact consists in making provision for an unlimited number of multipliers between the two end values. Management of these positions, of the iris whose aperture is adapted to each situation and of the complementary displacements of the focusing groups which are adapted to each focal length is accordingly performed by the computer provided in the control device.

The basic concept of this device is such that an operator has the possibility of controlling the focal length exactly in dependence on the level of light chosen. He may accordingly place the objective in the position which corresponds most effectively to the useful field, the aperture being determined by the maximum aperture which is permissible for the longest variable focal length chosen.

The table of FIG. 7 in any case indicates the variations in values of aperture of the objective as a function of the different focal lengths. The operator should therefore consult this table in order to adopt any coefficient of multiplication of the basic focal length which is best suited to his particular case of utilization. The variation in focal length may thus be centered with accuracy as a function of the extreme field angles chosen.

In addition to this essential advantage of utilization, the present device offers a certain number of other advantages.

One of these advantages lies in the fact that the exit pupil is not affected by the application of a coefficient of multiplication of the basic focal length and that the image is not impaired by any colored spot. This is due to the fact that no optical element is added behind the iris in the case under consideration and that the focal length ratio is chosen so as to ensure that there is no "ramping" or in other words no variation of the numerical aperture with the focal length. The light spectrum transmission is therefore unchanged.

Yet another advantage arises from the fact that the objective in accordance with the invention has a smaller number of lenses than in the objectives at present used for the application considered. This produces a reduction in absorption of light at the time of application of a focal-length multiplier by virtue of the fact that, in the present instance, the number of surfaces traversed accordingly remains the same. This also achieves a reduction in cost price. Yet a further advantage lies in the reduction in weight of the assembly as a result of elimination of the afocal-lens turret provided in current objectives of the type recalled earlier.

What is claimed is:

1. A method of control of a variable-focus objective lens system comprising two groups of lenses which are capable of moving along the optic axis so as to produce variations in the focal lengths as initiated by the operator while the final image remains stationary during these variations, and also comprising two other groups which carry out focusing by displacement and the position of which is defined as a function of two variables consisting of focal length and focusing distance, wherein the displacements of the two movable groups forming a variator are controlled by means of a computer and these groups are accordingly subjected not only to the necessary displacements of each group for the progressive variations of focal length but also to a complementary longitudinal displacement for applying to the objective-lens system a focal-length multiplier coefficient having a value chosen by the operator, another function of the computer being accordingly to produce the required variation of the iris and the complementary displacements of the focusing groups in respect of each focal length.

2. An objective-lens device according to claim 1, wherein the four groups of lenses and the various lenses of these groups comply with the following inequalities in which:

F'1, F'2, F'3 and F'4 each correspond to the focal length of one group in a direction away from the object viewed, f'1, f'2, ... f'25 each correspond to the focal length of one lens in a direction away from the object viewed, R1, R2, ... correspond to the radius of each surface of curvature in a direction away from the object viewed, (a) General relations $2(F'2) < (F'3) < 3(F'2)$ $2(F'3) < (F'1) < 3(F'3)$ (b) Relations in Group I $\frac{1}{2}F'1 < R2 < \frac{3}{2}F'1$ $\frac{1}{2}F'1 < R5 < \frac{3}{2}F'1$ $\frac{1}{2}F'1 < R7 < 2(F'1)$ $(F'1)(f'4) < 2(F'1)$ (c) Relations in Group II $(F'2) < R10 < 3(F'2)$ $(F'2) < (f'5) < 3(F'2)$ $(F'2) < (f'6) < 3(F'2)$ $(F'2) < (f'6) < 3(F'2)$ $1.65 < n9 < 1.85$ (d) Relations in Group III $(F'3) < (R21) < 2(F'3)$ $(F'3) < (R25) < 2(F'3)$ $(F'3) < (f'12) < 3(F'3)$ $(F'3) < (f'13) < 3(F'3)$ $(F'3) < (f'15) < 3(F'3)$.

3. An objective-lens device for a variable-focus objective lens system comprised by two groups of lenses which are capable of moving along the optic axis so as to produce variations in focal lengths as initiated by the operator while the final image remains stationary during these variations, and also comprised by two other groups which carry out focusing by displacement and the position of which is defined as a function of the two variables consisting of focal length and focusing distance, wherein (1) the two movable groups of lenses forming a variator have characteristics such that, in addition to the ability to produce variations in focal length of the lens system, they are capable under the action of a complementary longitudinal displacement of carrying out multiplication of the basic focal length and the arrangement is such that, in their end positions, these two groups are still capable of undergoing a similar complementary displacement; combination with this lens system, the device in (2) in combination with this lens system, the device in accordance with the invention is provided for the purpose of producing displacements of the movable groups of lens elements with a control system associated with a computer and capable of subjecting these two movable groups of lenses not only to the displacements required for each group in order to produce variations in focal length but also to a complementary longitudinal displacement in order to apply to the objective-lens system a focal length multiplier coefficient having a value chosen by the operator, another function of said computer being to produce the desired variation of the iris and the complementary displacements of the focusing groups in respect of each focal length.

* * * * *